United States Patent
Jales Costa et al.

(10) Patent No.: US 11,521,494 B2
(45) Date of Patent: Dec. 6, 2022

(54) VEHICLE ECCENTRICITY MAPPING

(71) Applicant: Ford Global Technologies, LLC, Dearborn, MI (US)

(72) Inventors: Bruno Sielly Jales Costa, Santa Clara, CA (US); Gintaras Vincent Puskorius, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 404 days.

(21) Appl. No.: 16/437,292

(22) Filed: Jun. 11, 2019

(65) Prior Publication Data
US 2020/0394917 A1 Dec. 17, 2020

(51) Int. Cl.
| | |
|---|---|
| G08G 1/16 | (2006.01) |
| G06T 7/254 | (2017.01) |
| G06T 7/194 | (2017.01) |
| G06V 20/54 | (2022.01) |

(52) U.S. Cl.
CPC .......... *G08G 1/164* (2013.01); *G06T 7/194* (2017.01); *G06T 7/254* (2017.01); *G06V 20/54* (2022.01); *G08G 1/166* (2013.01); *G06T 2207/10016* (2013.01); *G06T 2207/30236* (2013.01)

(58) Field of Classification Search
CPC . G06T 7/254; G06T 7/11; G06T 2207/30261; G05D 1/0238
See application file for complete search history.

(56) References Cited

U.S. PATENT DOCUMENTS

| | | |
|---|---|---|
| 5,706,417 A | 1/1998 | Adelson |
| 5,787,199 A | 7/1998 | Lee |
| 6,580,812 B1 | 6/2003 | Harrington |
| 6,956,469 B2 | 10/2005 | Hirvonen et al. |
| 7,149,328 B2 | 12/2006 | Kamijo et al. |
| 7,418,113 B2 | 8/2008 | Porikli et al. |
| 7,710,461 B2 | 5/2010 | Nagano et al. |
| 7,881,497 B2 | 2/2011 | Ganguli et al. |

(Continued)

FOREIGN PATENT DOCUMENTS

| | | |
|---|---|---|
| CN | 102201121 A | 9/2011 |
| CN | 101582160 B | 9/2013 |

(Continued)

OTHER PUBLICATIONS

A. Broggi, R. I. Fedriga, A. Tagliati, T. Graf and M. Meinecke, "Pedestrian Detection on a Moving Vehicle: an Investigation about Near Infra-Red Images," 2006 IEEE Intelligent Vehicles Symposium, 2006, pp. 431-436 (Year: 2006).*

(Continued)

*Primary Examiner* — Peter D Nolan
*Assistant Examiner* — Wae L Louie
(74) *Attorney, Agent, or Firm* — Frank A. MacKenzie; Bejin Bieneman PLC

(57) ABSTRACT

A computer, including a processor and a memory, the memory including instructions to be executed by the processor to detect a moving object in video stream data based on determining an eccentricity map. The instructions can further include instructions to determine a magnitude and direction of motion of the moving object, transform the magnitude and direction to global coordinates and operate a vehicle based on the transformed magnitude and direction.

20 Claims, 8 Drawing Sheets

(56) References Cited

U.S. PATENT DOCUMENTS

| | | | |
|---|---|---|---|
| 7,920,959 B1* | 4/2011 | Williams | G08G 1/056 345/614 |
| 8,094,943 B2 | 1/2012 | Eaton et al. | |
| 8,120,661 B2 | 2/2012 | Rabinowitz et al. | |
| 8,328,653 B2 | 12/2012 | Lock | |
| 8,379,926 B2* | 2/2013 | Kanhere | G06T 7/55 382/104 |
| 8,611,593 B2 | 12/2013 | Chen et al. | |
| 8,718,327 B2 | 5/2014 | Tong et al. | |
| 8,947,529 B2 | 2/2015 | Strine et al. | |
| 9,171,390 B2 | 10/2015 | Summer et al. | |
| 9,300,871 B2 | 3/2016 | Zhou et al. | |
| 9,418,320 B2 | 8/2016 | Chang et al. | |
| 9,542,626 B2 | 1/2017 | Martinson et al. | |
| 9,558,424 B2 | 1/2017 | Ramalingam et al. | |
| 9,665,804 B2 | 5/2017 | Sarkis et al. | |
| 9,716,832 B2 | 7/2017 | Ryu et al. | |
| 9,756,248 B1 | 9/2017 | Wu et al. | |
| 9,804,713 B2* | 10/2017 | Guarneri | G06F 3/044 |
| 9,854,168 B2 | 12/2017 | Wu et al. | |
| 10,055,850 B2 | 8/2018 | Piekniewski et al. | |
| 10,535,127 B1 | 1/2020 | Simonson et al. | |
| 10,705,525 B2 | 7/2020 | Smolyanskiy et al. | |
| 10,769,799 B2* | 9/2020 | Jales Costa | G06V 10/435 |
| 11,253,953 B1 | 2/2022 | Jiang et al. | |
| 2002/0041339 A1 | 4/2002 | Diepold | |
| 2004/0076324 A1 | 4/2004 | Burl et al. | |
| 2008/0195316 A1 | 8/2008 | Krishnaswamy | |
| 2014/0218555 A1* | 8/2014 | Kuo | G06T 11/60 348/222.1 |
| 2015/0003676 A1* | 1/2015 | Kuchiki | G06T 7/254 382/103 |
| 2015/0310274 A1 | 10/2015 | Shreve et al. | |
| 2015/0339589 A1 | 11/2015 | Fisher | |
| 2016/0125245 A1 | 5/2016 | Saitwal et al. | |
| 2016/0125621 A1 | 5/2016 | Saitwal et al. | |
| 2016/0173787 A1 | 6/2016 | Yun | |
| 2016/0236790 A1* | 8/2016 | Knapp | G01C 21/20 |
| 2016/0292882 A1 | 10/2016 | Comport et al. | |
| 2017/0053554 A1* | 2/2017 | Nalepka | G09B 5/02 |
| 2017/0053555 A1* | 2/2017 | Angel | G07C 5/0808 |
| 2017/0206717 A1* | 7/2017 | Kühnapfel | G06Q 40/08 |
| 2017/0236252 A1* | 8/2017 | Nguyen | G06T 15/00 345/419 |
| 2017/0358119 A1* | 12/2017 | Forutanpour | G06T 11/001 |
| 2018/0024562 A1 | 1/2018 | Bellaiche | |
| 2018/0218214 A1 | 8/2018 | Pestun et al. | |
| 2019/0079535 A1 | 3/2019 | Zhu et al. | |
| 2019/0114491 A1* | 4/2019 | Takaki | B60W 30/0956 |
| 2019/0286153 A1 | 9/2019 | Rankawat et al. | |
| 2020/0053286 A1* | 2/2020 | Corona | H04N 5/23267 |
| 2020/0065663 A1* | 2/2020 | Singh | G06V 10/806 |
| 2020/0065978 A1* | 2/2020 | Jales Costa | G06V 20/56 |
| 2020/0065980 A1* | 2/2020 | Jales Costa | G06T 7/11 |
| 2020/0111358 A1* | 4/2020 | Parchami | G08G 1/056 |
| 2020/0142421 A1 | 5/2020 | Palanisamy et al. | |
| 2020/0189573 A1* | 6/2020 | King | B60W 30/0956 |
| 2020/0380763 A1 | 12/2020 | Abramov | |
| 2020/0394917 A1 | 12/2020 | Jales Costa et al. | |
| 2020/0409385 A1* | 12/2020 | Chakravarty | G05D 1/0253 |

FOREIGN PATENT DOCUMENTS

| | | |
|---|---|---|
| CN | 102592112 B | 1/2014 |
| CN | 103077531 B | 11/2015 |
| CN | 106952474 A | 7/2017 |
| CN | 108230367 A | 6/2018 |
| CN | 110737834 A | 1/2020 |
| CN | 110858316 A | 3/2020 |
| CN | 111986128 A | 11/2020 |
| CN | 112146618 A | 12/2020 |
| DE | 102019122402 A1 | 2/2020 |
| DE | 102020113848 A1 | 11/2020 |
| WO | 2016108847 A1 | 7/2016 |
| WO | 2017206999 A1 | 12/2017 |
| WO | 2018170393 A9 | 9/2018 |

OTHER PUBLICATIONS

Angelov, "Outside the Box: An Alternative Data Analytics Framework", Journal of Automation, Mobile Robotics & Intelligent Systems, vol. 8, N° 2, 2014.

Chen et al., "Object-Based Features for House Detection from RGB High-Resolution Images", Remote Sens. 2018, 10, 451; doi:10.3390/rs10030451, www.mdpi.com/journal/remotesensing.

Kim et al., "Foreground Objects Detection by U-Net with Multiple Difference Images", Appl. Sci. 2021, 11, 1807. https://doi.org/10.3390/app11041807, https://www.mdpi.com/journal/applsci.

Nister et al., "Visual Odometry for Ground Vehicle Applications", published in Journal of Field Robotics, Jan. 26, 2006 (35 pages).

Wang et al., "An Optimization Clustering Algorithm Based on Texture Feature Fusion for Color Image Segmentation", Algorithms 2015, 8, 234-247; doi:10.3390/a8020234, ISSN 1999-4893, www.mdpi.com/journal/algorithms.

The 20BN-jester Dataset V1, retrieved from Internet URL: https://20bn.com/datasets/jester (6 pages).

Notice of Allowance dated Jun. 2, 2022; U.S. Appl. No. 16/421,563, filed May 24, 2019.

Non-Final Office Action dated Jul. 26, 2022; U.S. Appl. No. 16/456,192, filed Jun. 28, 2019.

* cited by examiner

VEHICLE ECCENTRICITY MAPPING

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
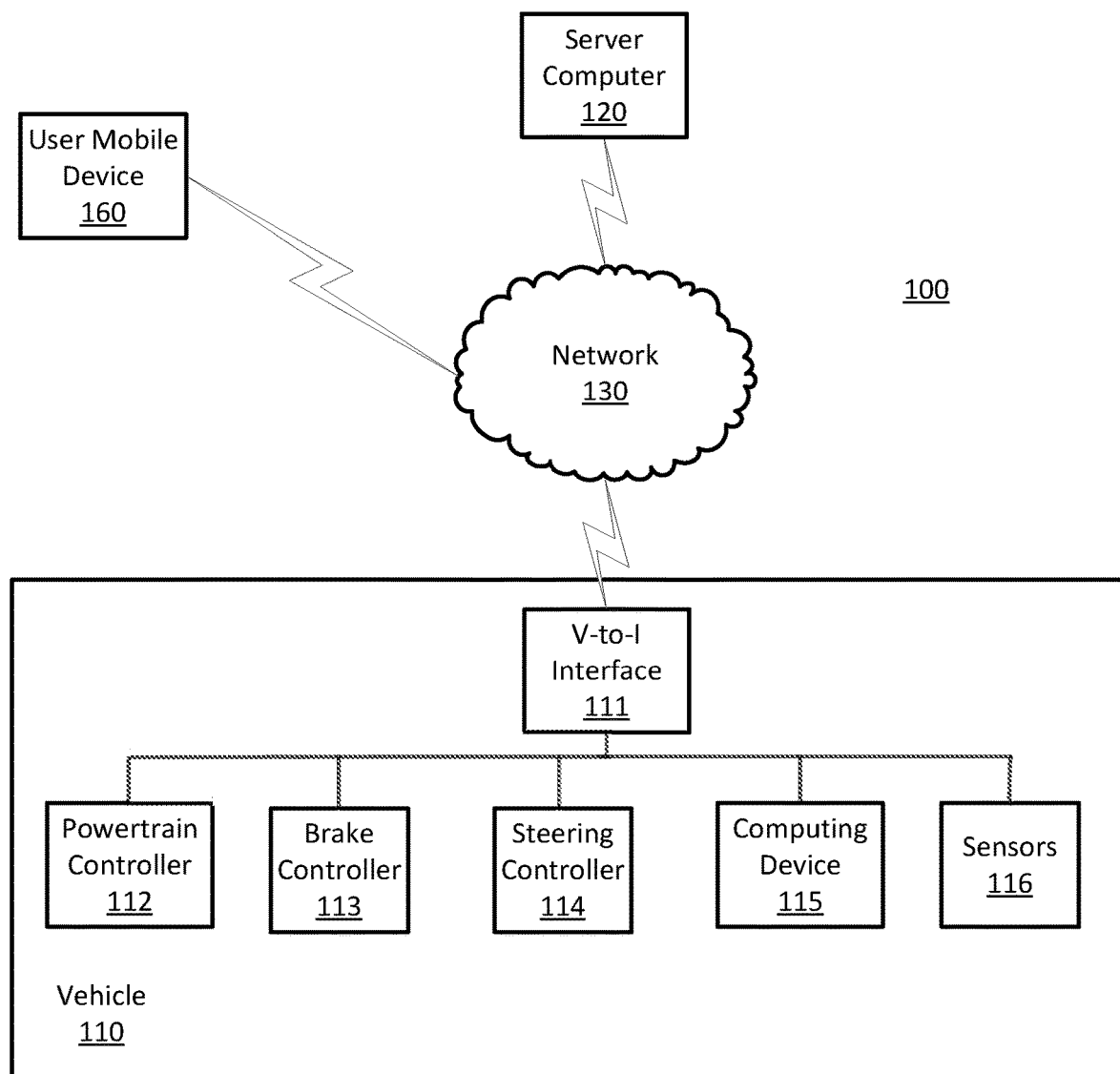
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of an information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding an external environment of a vehicle and to use the data to determine a vehicle path upon which to operate a vehicle in autonomous or semi-autonomous mode. A vehicle's path is a straight and/or curved line that describes successive locations (i.e., locations at different times) of a vehicle on a two-dimensional (2D) plane parallel to the surface of a roadway upon which the vehicle operates. A vehicle can operate on a roadway based on a vehicle's path by determining commands to direct the vehicle's powertrain, braking, and steering components to operate a vehicle so as to move along the path. The data regarding the external environment can include the location of an object in global coordinates. Global coordinates are measured with respect to a defined frame of reference, for example latitude, longitude and altitude. Example objects can include vehicles and pedestrians. The moving object data can be based on processing video camera data acquired by vehicle sensors or sensors included in a traffic infrastructure system.

Operating a vehicle based on moving object data can include determining a vehicle path that avoids the moving objects. Predicting a path for moving objects that includes future locations for moving objects can permit a computing device to determine a vehicle path that avoids the moving objects. Techniques discussed herein can improve vehicle operation by determining speed and direction for moving objects detected in video stream data from a stationary video camera. Speed and direction of moving objects can be determined based on processing video stream data to determine an eccentricity map as is described below in relation to FIG. 3. Speed and direction of moving objects can be determined based on an eccentricity map without any prior information input or offline training. Techniques described herein can provide improved computational speed and efficiency, e.g., can estimate moving object speed and direction with respect to pixel coordinates in a frame of video data at a rate of over one hundred frames per second using current computing technology. Techniques described herein do not require user-defined parameters or assumptions regarding probability distributions corresponding to image data. Techniques described herein can handle concept drift or concept evolution, where concept drift or concept evolution refer to changes in the underlying pixel data corresponding to a moving object over time in video stream data.

Disclosed herein is method including detecting a moving object in video stream data based on determining an eccentricity map, determining a magnitude and direction of motion of the moving object, transforming the magnitude and direction to global coordinates and operating a vehicle based on the transformed magnitude and direction. The eccentricity map can be determined based on per-pixel mean and per-pixel variance calculated on video stream data. The eccentricity map can be determined based on a finite window of video frames determined by a user input forgetting factor $\alpha$. The moving object can be detected by determining a foreground mask based on thresholding the eccentricity map. The moving object can be detected by determining a connected region of pixels based on the foreground mask and determining a bounding box based on the connected region. The x and y motion gradients of the moving object can be determined by calculating and accumulating gradients of horizontal and vertical line segments respectively of foreground pixels in the bounding box. The magnitude and direction of motion of the moving object can be determined based on the x and y motion gradients.

The magnitude and direction can be transformed from pixel coordinates to global coordinates based on a three-dimensional, six-axis location and direction of a field of view of a video camera that acquired the video stream data, a magnification of a lens included in the video camera, and a location of a two-dimensional plane corresponding to a roadway in the field of view of the video camera. A vehicle path can be determined based on the magnitude and direction. The vehicle can be operated on the vehicle path and thereby avoid the moving object. The eccentricity map can be determined based on video stream data acquired by a stationary video camera included in a traffic infrastructure system. The magnitude and direction of motion of the moving object can be determined by a server computer included in the traffic infrastructure system. The magnitude and direction of motion of the moving object can be communicated from the server computer included in the traffic infrastructure system to a computing device included in the vehicle. The moving object can include one or more of a pedestrian, bicyclist, a vehicle, or any other objects of interest.

Further disclosed is a computer readable medium, storing program instructions for executing some or all of the above method steps. Further disclosed is a computer programmed for executing some or all of the above method steps, including a computer apparatus, programmed to detect a moving object in video stream data based on determining an eccentricity map, determine a magnitude and direction of motion of the moving object, transform the magnitude and direction to global coordinates and operate a vehicle based on the transformed magnitude and direction. The eccentricity map can be determined based on per-pixel mean and per-pixel variance calculated on video stream data. The eccentricity map can be determined based on a finite window of video frames determined by a user input forgetting factor $\alpha$. The moving object can be detected by determining a foreground mask based on thresholding the eccentricity map. The moving object can be detected by determining a connected region of pixels based on the foreground mask and determining a bounding box based on the connected region. The x and y motion gradients of the moving object can be determined by calculating and accumulating gradients of horizontal and vertical line segments respectively of foreground pixels in the bounding box. The magnitude and direction of motion of the moving object can be determined based on the x and y motion gradients.

The computer apparatus can be further programmed to transform the magnitude and direction from pixel coordinates to global coordinates based on a three-dimensional, six-axis location and direction of a field of view of a video camera that acquired the video stream data, a magnification of a lens included in the video camera, and a location of a two-dimensional plane corresponding to a roadway in the field of view of the video camera. A vehicle path can be determined based on the magnitude and direction. The vehicle can be operated on the vehicle path and thereby avoid the moving object. The eccentricity map can be determined based on video stream data acquired by a stationary video camera included in a traffic infrastructure system. The magnitude and direction of motion of the moving object can be determined by a server computer included in the traffic infrastructure system. The magnitude and direction of motion of the moving object can be communicated from the server computer included in the traffic infrastructure system to a computing device included in the vehicle. The moving object can include one or more of a pedestrian and a vehicle.

FIG. 1 is a diagram of a traffic infrastructure system 100 that includes a vehicle 110 operable in autonomous ("autonomous" by itself in this disclosure means "fully autonomous"), semi-autonomous, and/or occupant piloted (also referred to as non-autonomous) mode. One or more vehicle 110 computing devices 115 can receive information regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
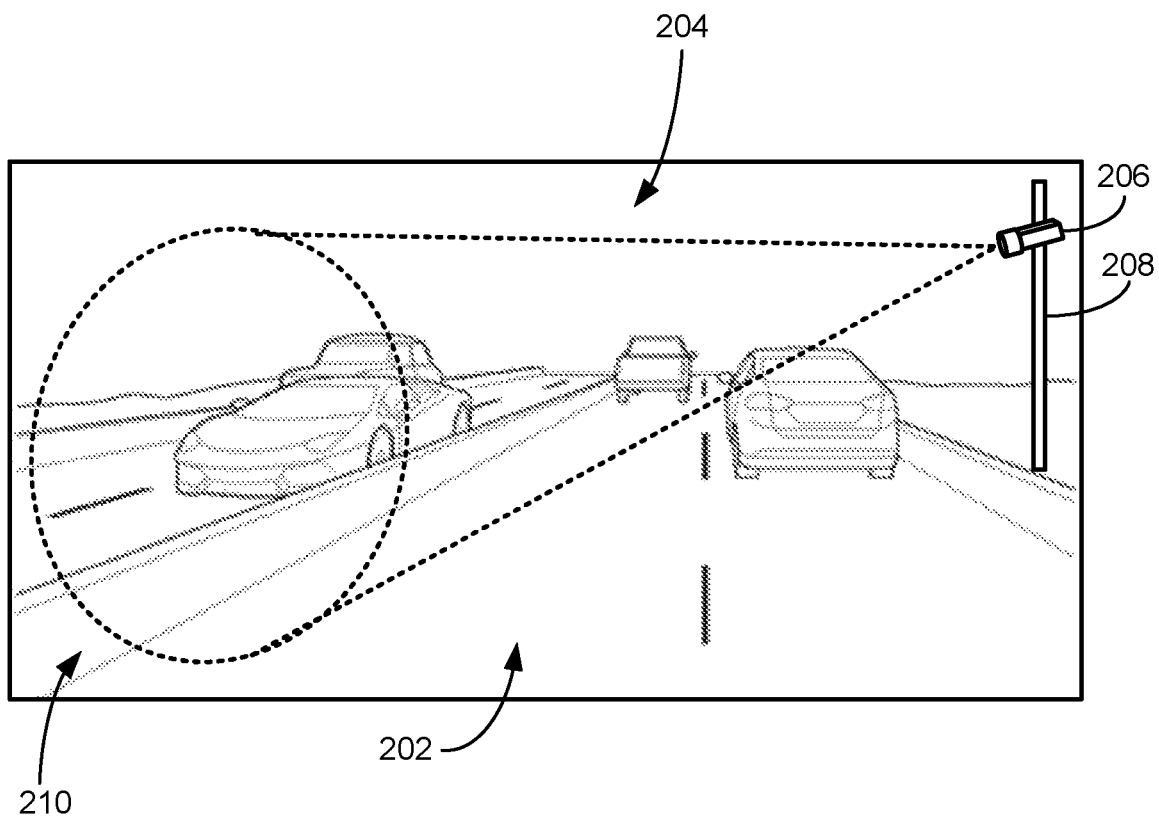
FIG. 2 is a diagram of an example image of a traffic scene.

FIG. 2 is a diagram of a traffic scene 200. Traffic scene 200 includes a roadway 202 and vehicles 204 traveling on the roadway 202. Traffic scene 200 also includes a video camera 206 mounted on a pole 208 that permits video camera 206 to acquire video stream data including frames of video data from a field of view 210 illustrated in traffic scene 200 by dotted lines. Video camera 206 can acquire red-green-blue (RGB) video data or video data including other encodings and wavelengths of light. For example, video camera 206 can acquire infrared (IR) video data or combinations of visible and IR wavelengths. Video camera 206 can be mounted on other platforms that provide a view of roadway 202 and, from time to time, vehicles 204 as they pass through field of view 210, for example buildings or other structures like overpasses, signs, or traffic signals. Video camera 206 can also be mounted on moveable platforms like vehicles, drones, or portable towers, as long as the video camera 206 and therefore the field of view 210 can be held stationary for a period of time required to perform calculations discussed herein. The period of time required to perform calculations discussed herein can range from less than one second to less than 10 seconds.

Video camera 206 can be in communication with a traffic infrastructure system 100. Traffic infrastructure system 100 can include a computing device that acquires video stream data from a video camera 206 and processes the video stream data to determine data regarding moving objects, including vehicles 204 and pedestrians, for example, in a field of view 210. Traffic infrastructure system 100 can acquire data regarding the six-axis location of video camera 206. Data regarding the six-axis location of a video camera can be obtained by acquiring an image of an object where the size, location and orientation of the object with respect to the roadway 202 are measured in the real world in global coordinates. Six-axis location includes the three-dimensional (3D) position of video camera 206 on x, y, and z axes, measured with respect to a global coordinates system such as latitude, longitude and altitude. Six-axis location also includes direction measured as roll, pitch, and yaw rotations about each of the x, y, and z axes, respectively. By determining the six-axis location of a video camera 206, the magnification of a lens included in video camera 206 and therefore the shape and size of field of view 210, along with data regarding the location of a two-dimensional plane parallel to roadway 202, objects located in video data from video camera 206 can be transformed from pixel coordinates relative to a video frame to real-world coordinates.

Figure 3:
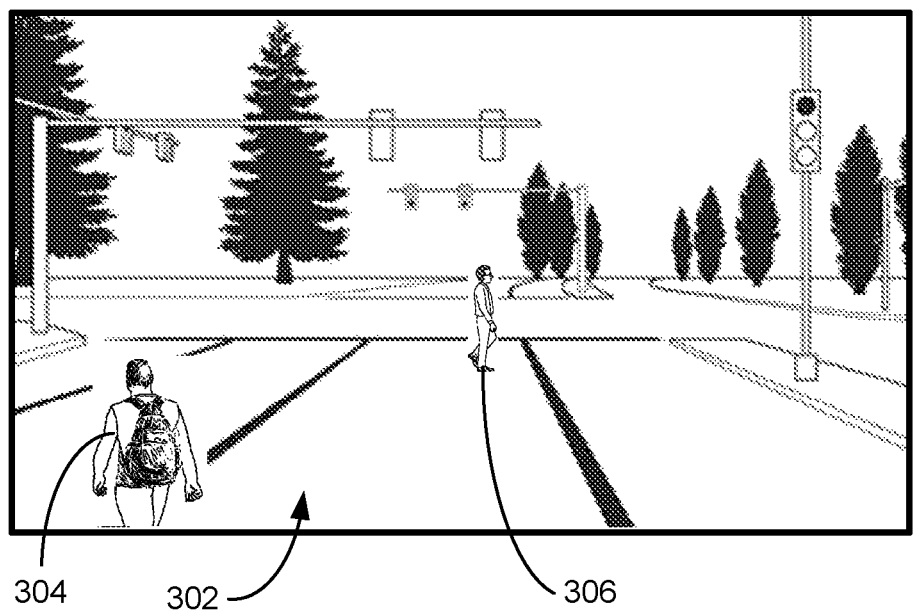
FIG. 3 is a diagram of an example image of a traffic scene acquired by a stationary camera.

FIG. 3 is a diagram of an image 300 of a traffic scene rendered in black and white to comply with Patent Office regulations. Image 300 can be a frame of video data from a video camera 206, for example. Image 300 includes a roadway 302, and pixel data corresponding to two pedestrians 304, 306. Techniques described herein can improve the operation of a vehicle 110 by determining a speed and direction for moving objects in a field of view 210 of a video camera 206, in this example two pedestrians 304, 306. A vehicle 110 can operate on a roadway 302 by determining a vehicle path that predicts future locations of the vehicle 110 as it operates on the roadway 302. Determining speed and direction of moving objects with respect to a vehicle 110 can permit a computing device 115 to determine a vehicle path that avoids the moving objects based on predicted future locations of the vehicle 110 and the moving objects.

Figure 4:
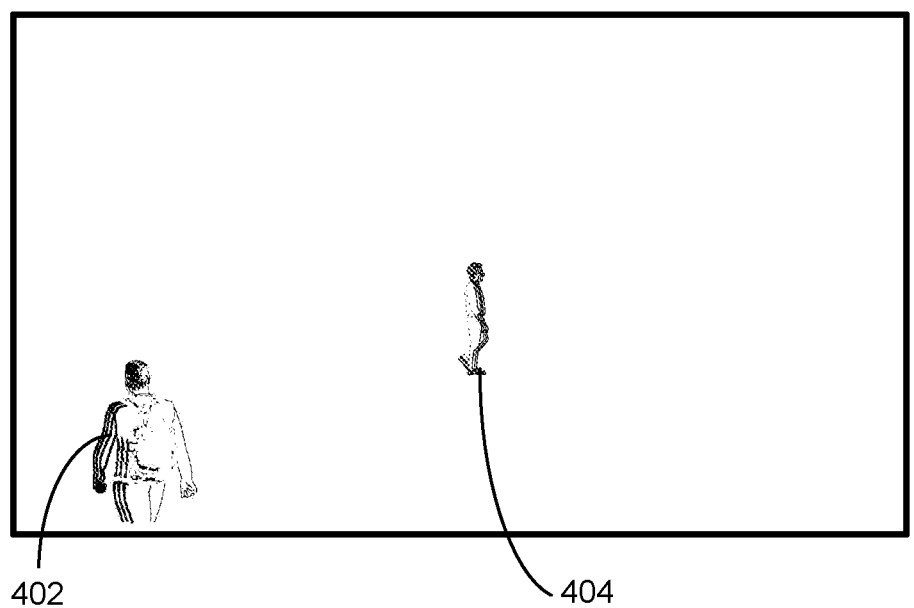
FIG. 4 is diagram of an example image of a traffic scene illustrating eccentricity processing.

FIG. 4 is an example eccentricity image or map 400 rendered in black and white to comply with Patent Office regulations. In addition, we note that the background of eccentricity map 400 is rendered as white, which usually denotes high eccentricity values, rather than black, which usually denotes low eccentricity values to improve legibility. Eccentricity map 400 is output by an eccentricity process described by equations (1)-(5) in response to input video stream data. Prior to calculating an eccentricity map 440, pixel data can be transformed from a multiple value format like red-green-blue (RGB) encoding where each pixel can include three eight-bit values corresponding to red, green and blue video channels into a single eight-bit grayscale value, for example. Eccentricity is a measure of the amount of change in value of pixels in a video stream data, where video stream data includes a plurality of frames of video data acquired at equal time intervals. Eccentricity processing calculates a per-pixel normalized eccentricity $\varepsilon_k$ for a video frame (time) k of video stream data based on determining per-pixel mean and variance for video stream data and comparing a pixel's current value to the mean value for that pixel including variance. Eccentricity $\varepsilon_k$ can determine contiguous regions of pixels corresponding to moving objects in a video stream data by determining foreground and background pixels based on a pixel's eccentricity $\varepsilon_k$ value. Eccentricity $\varepsilon_k$ tends to be zero or small (near zero) for pixels that do not change values over time, from video frame to video frame, i.e. background pixels. Eccentricity $\varepsilon_k$ tends to be non-zero for pixels that change values over time, i.e. foreground pixels. Foreground pixels correspond to moving objects like vehicle and pedestrians. At time k, a per-pixel mean $\mu_k$ for pixel value samples up to time k can be calculated by equation (1):

$$\mu_k = (1-\alpha)\mu_{k-1} + \alpha x_k \qquad (1)$$

where $x_k$ is the pixel value at time k and $\alpha$ is an exponential decay factor in the range (0,1) and corresponds to a "forgetting factor" which decreases the effect of video data on eccentricity $\varepsilon_k$ as distance from time k increases, having the effect of a finite window of video frames that updates each frame. The constant $\alpha$ can be determined by user input. Per-pixel variance $\sigma_k^2$ for samples up to time k can be calculated by equations (2) and (3) using a temporary variable $d_k^2$:

$$d_k^2 = (x_k - \mu_k)^T(x_k - \mu_k) = \|x_k - \mu_k\|^2 \qquad (2)$$

$$\sigma_k^2 = (1-\alpha)\sigma_{k-1}^2 + \frac{\alpha}{(1-\alpha)}d_k^2 \qquad (3)$$

Per-pixel mean $\mu_k$ and variance $\sigma_k^2$ can be combined to calculate eccentricity $\varepsilon_k$:

$$\varepsilon_k = \alpha\left(1 + \frac{\|x_k - \mu_k\|^2}{\max[\gamma, \sigma_k^2]}\right) \qquad (4)$$

where $\max[\gamma, \sigma_k^2]$ is a function that selects the maximum between variance $\sigma_k^2$ and a constant $\gamma$, which can be determined by user input to avoid numerical instability when $\sigma_k^2$ is near zero. Normalized eccentricity $\varepsilon_{k_{norm}}$ can be calculated by equation (5), which normalizes eccentricity $\varepsilon_{k_{norm}}$ to assume values in the range (0,1):

$$\varepsilon_{k_{norm}} = \frac{\alpha}{(1-\alpha)}\left(1 + \frac{\|x_k - \mu_k\|^2}{\max[\gamma, \sigma_k^2]}\right) \qquad (5)$$

FIG. 4 includes two moving objects 402, 404, corresponding to pedestrians 302, 304 from FIG. 3. Pixel data values corresponding to the moving objects 402, 404 have higher average intensities near the edge of the moving object 402, 404 closest to the direction of motion, where the pixel intensities are proportional to the moving object 402, 404 speed. Techniques described herein detect and analyze pixel data corresponding to moving objects 402, 404 to determine moving object 402, 404 speed and direction. A video data stream can be processed to determine an eccentricity map 400. The eccentricity map 400 can be processed to determine a foreground map by thresholding the eccentricity map 400 using a user input threshold to separate foreground (non-zero) pixels from background (zero or near-zero) pixels. The foreground pixels can be processed using image morphology to create connected regions of contiguous foreground pixels. Image morphology is an image processing technique that relies on 2D shapes to form spatial filters. The foreground mask can be used to identify and locate moving objects. By forming a logical AND between the pixels of the eccentricity map 400 and the foreground mask, eccentricity pixel data corresponding to moving objects 402, 404 can be identified and located.

Figure 5:
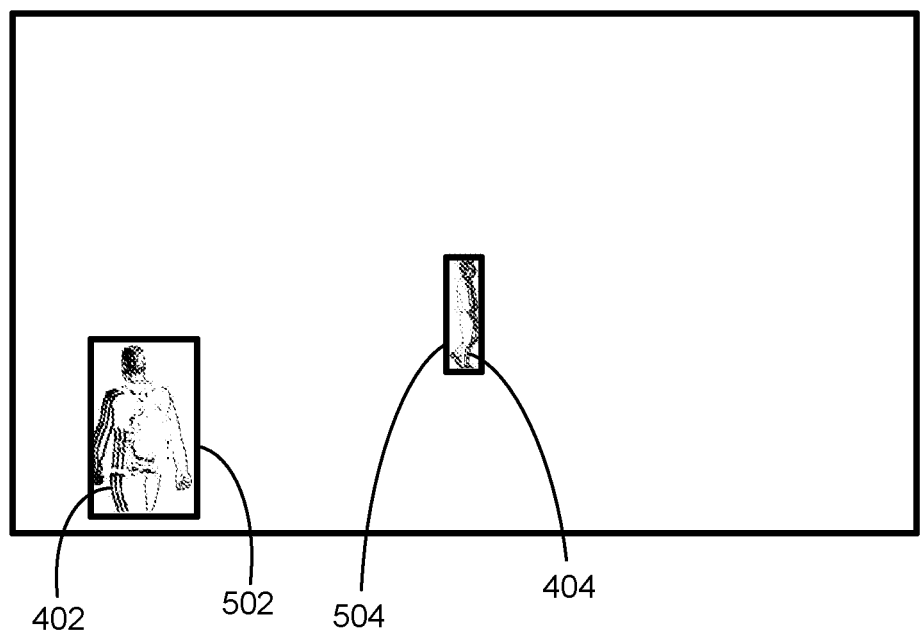
FIG. 5 is a diagram of an example image of a traffic scene with identified moving objects.

FIG. 5 is a diagram of an eccentricity map 500 including moving objects 402, 404 including bounding boxes 502, 504 fit around the moving objects 402, 404 respectively. Similar to FIG. 4, we note that the background of eccentricity map 500 is rendered as white, which usually denotes high eccentricity values, rather than black, which usually denotes low eccentricity values to improve legibility. Bounding boxes 502, 504 are formed by determining minimally enclosing rectangles around the connected regions of contiguous foreground pixels corresponding to moving objects 402, 404 as determined above in relation to FIG. 4. The location of bounding boxes 502, 504 in pixel coordinates is the location of moving objects 402, 404. For example, the geometric center of the bounding boxes 502, 504 in pixel coordinates can be the location of the moving objects 402, 404, respectively. The pixel data within the bounding boxes 502, 504 can be processed by calculating gradients as discussed below in relation to FIG. 6 to determine a direction and speed for the moving objects 402, 404.

Figure 6:
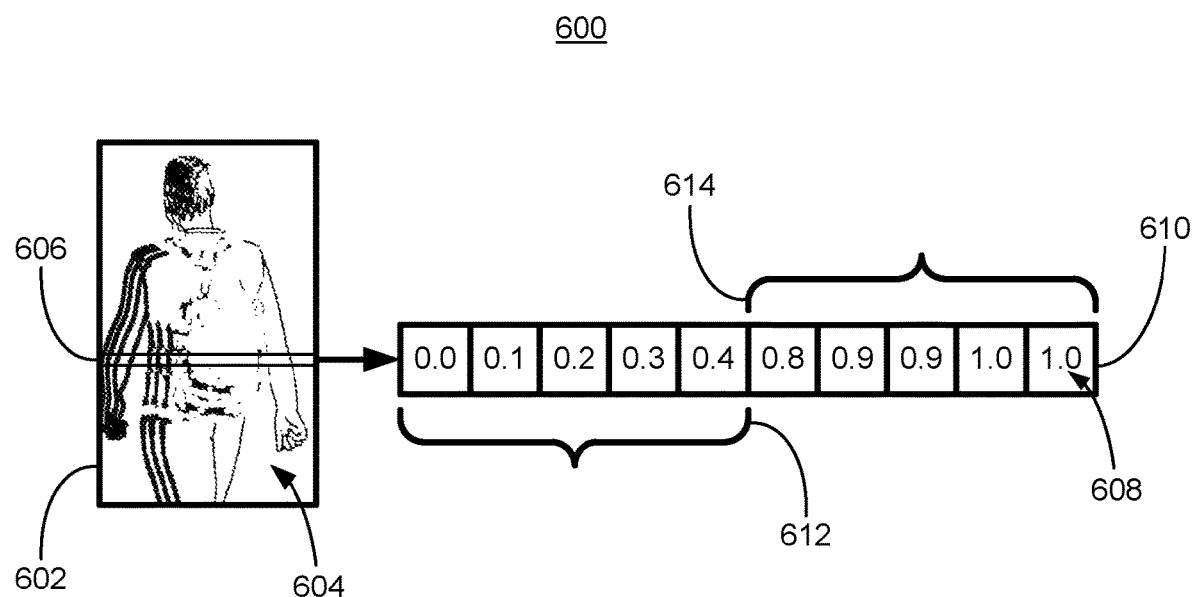
FIG. 6 is a diagram of an example eccentricity gradient.

FIG. 6 is a diagram of example eccentricity gradient calculation. Similar to FIGS. 4 and 5, we note that the background of bounding box 602 is rendered as white, which usually denotes high eccentricity values, rather than black, which usually denotes low eccentricity values to improve legibility. Eccentricity gradient calculation determines gradients for each moving object 402, 404 by first calculating a horizontal gradient $g_x$ and a vertical gradient $g_y$. FIG. 6 illustrates this with example bounding box 602 which includes foreground pixels 604 corresponding to a moving object 402, 404. Eccentricity gradient calculation extracts a horizontal line segment 606 from bounding box 602 by copying the pixel values 608 within the horizontal line segment 606 into a buffer 610. Buffer 610 is divided into a left part 612 and a right part 614. Horizontal gradient $g_x$ is determined by subtracting the sum of the pixel values 608 in the left part 612 (1.0 in this example) from the sum of the pixel values 608 in the right part 614 (4.6 in this example) and sum the result (3.6 in this example) to the horizontal gradient $g_x$. This calculation is repeated for each horizontal line segment 606 in bounding box 602 to determine the horizontal gradient $g_x$.

Eccentricity gradient calculation calculates the vertical gradient $g_y$ in the same fashion, extracting pixel values 608 from each vertical line segment included in bounding box 602, subtracting summed top and bottom parts of the resulting buffer and adding the result to vertical gradient $g_y$. The horizontal gradient $g_x$ and the vertical gradient $g_y$ can be combined according to the following equations to calculate motion components including direction θ of motion and magnitude or speed G:

$$\theta = \tan^{-1}\left(\frac{g_y}{g_x}\right) \quad (6)$$

$$G = \sqrt{g_x^2 + g_y^2} \quad (7)$$

Values for direction θ and speed G can be combined with x, y location from the bounding box for each moving object 402, 404.

Figure 7:
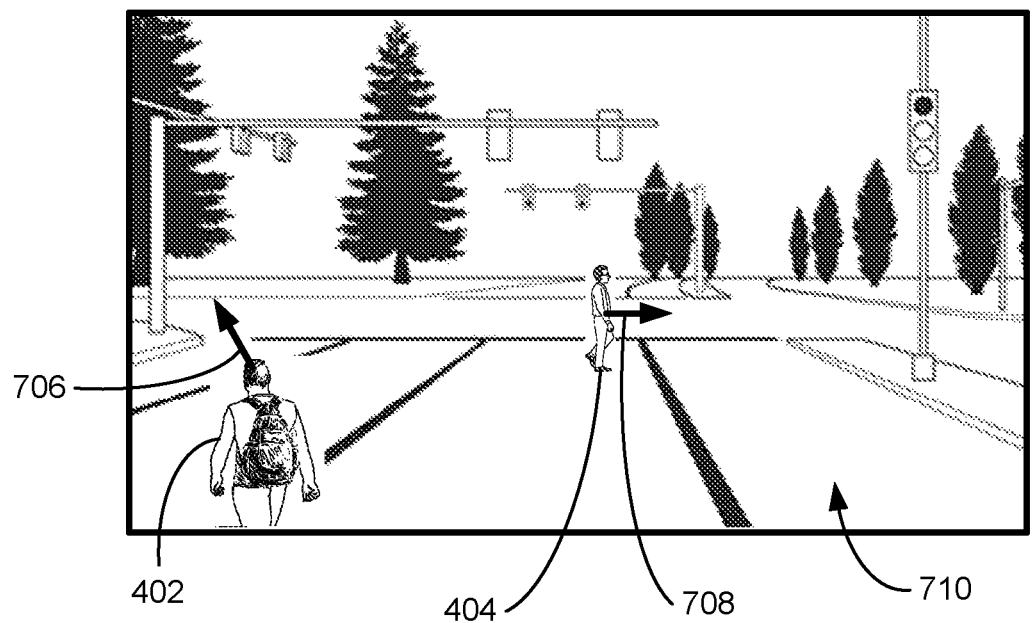
FIG. 7 is a diagram of an example image of traffic scene with moving objects including direction and speed.

FIG. 7 is a diagram of an image 700 of a traffic scene including moving objects 402, 404 with arrows 706, 708, respectively, overlaid on the image 700 where the direction of the arrow 706, 708 is equal to the direction of motion θ and the length of the arrow 706, 708 is proportional to the speed G as determined by gradient calculations performed on eccentricity map data as discussed above in relation to FIGS. 4-6, above. Values of direction θ and speed G for each moving object 402, 404 and a location in pixel coordinates can be transformed into global coordinates using data regarding the six-axis location and orientation of the video camera that acquired the video stream data, a magnification of a lens included in the video camera and data regarding the location of a 2D plane parallel to a roadway 710 included in the field of view of the video camera. The video camera location, orientation, magnification and location of the 2D plane can be determined empirically by acquiring a video image of an object with measured features at a measured location in the field of view as discussed above.

Location, direction and speed for moving objects in global coordinates can be communicated to a computing device 115 included in a vehicle 110. Computing device 115 can use the location, speed and direction data to determine a vehicle path upon which to operate vehicle 110. Computing device 115 can determine a vehicle path and command vehicle powertrain, steering, and brakes via controllers 112, 113, 114 to cause vehicle 110 to operate along the vehicle path. Data regarding location, direction and speed corresponding to moving objects 402, 404 can be included in the determination of the vehicle path to determine a vehicle path that avoids the moving object 402, 404, for example. Techniques described herein improves the operation of vehicle 110 by providing fast and efficient calculations of moving object's 402, 404 direction, speed and location, without requiring complex user-defined parameters thereby permitting computing device 115 to efficiently determine a vehicle path for operation of vehicle 110 that safely avoids moving objects 402, 404.

Figure 8:
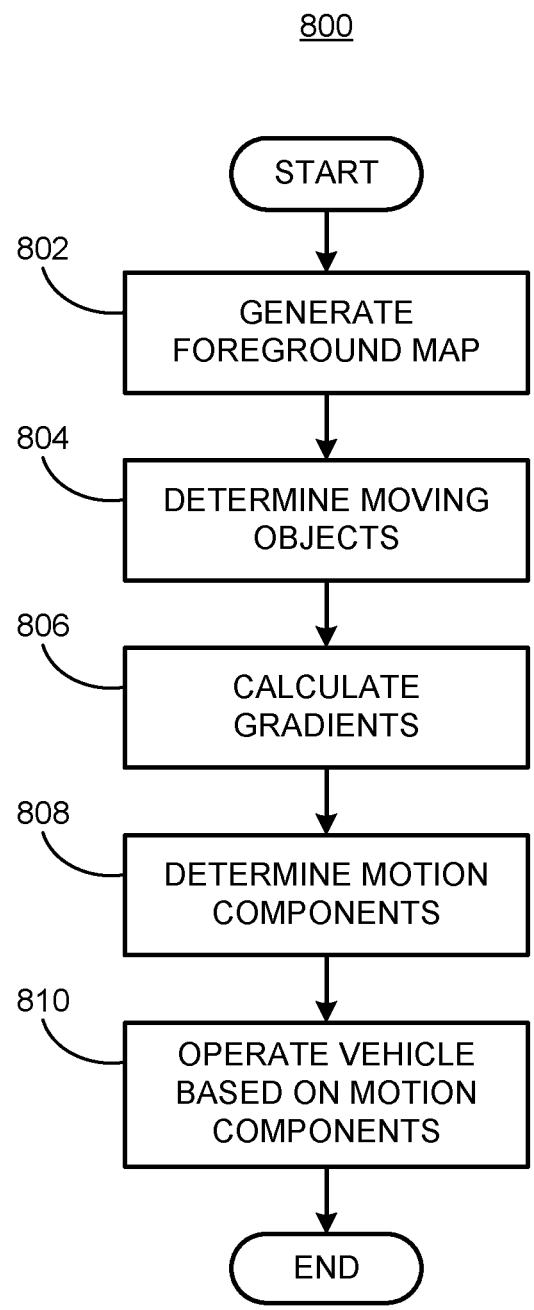
FIG. 8 is a flowchart diagram of a process to operate a vehicle based on moving object motion components.

FIG. 8 is a diagram of a flowchart, described in relation to FIGS. 1-7, of a process 800 for operating a vehicle based on determining motion components for moving objects. Process 800 can be implemented by a processor of computing device 115, taking as input information from sensors, and executing commands, and sending object tracking information to a vehicle 110, for example. Process 800 includes multiple blocks taken in the disclosed order. Process 800 could alternatively or additionally include fewer blocks or can include the blocks taken in different orders.

Process 800 begins at block 802, where a computing device acquires video stream data and determines an eccentricity map 400 as discussed above in relation to FIG. 4. The video stream data can be acquired from a stationary video camera 206 with determined six-axis location and orientation, lens magnification and a location of a 2D plane parallel to a roadway 202 in the field of view 210 of the video camera 206.

At block 804 a computing device determines moving objects 402, 404 by determining a foreground mask as discussed above in relation to FIG. 4 and masking the eccentricity map 400 determine connected regions of pixels and bounding boxes 502, 504 for each moving object 402, 404.

At block 806 a computing device calculates horizontal gradient $g_x$ and the vertical gradient $g_y$ for each moving object 402, 404 according to calculations discussed in relation to FIG. 5, above and equations (6) and (7).

At block 808 a computing device determines direction and speed motion components for each moving object 402, 404 based on horizontal gradients $g_x$ and vertical gradients $g_y$. This data can be combined with location data from bounding boxes 502, 504 and transformed from pixel coordinates to global coordinates as described above in relation to FIG. 6, above.

At block 810 a computing device 115 in a vehicle 110 can determine a vehicle path that avoids the moving object 402, 404 based on transformed direction and speed coordinates and operate vehicle 110 by commanding vehicle powertrain, steering and brakes to cause vehicle 110 to travel along the vehicle path. Following block 810 process 800 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A computer, comprising a processor; and
a memory, the memory including instructions to be executed by the processor to:
detect a moving object in video stream data based on determining an eccentricity map and determining a foreground mask based on thresholding the eccentricity map;
determine a magnitude and direction of motion of the moving object;
transform the magnitude and direction to global coordinates; and
operate a vehicle based on the transformed magnitude and direction.

2. The computer of claim 1, the instructions further including instructions to determine the eccentricity map based on per-pixel mean and per-pixel variance calculated on video stream data.

3. The computer of claim 1, the instructions further including instructions to determine the eccentricity map based on video stream data determined by a user input forgetting factor α.

4. The computer of claim 1, the instructions further including instructions to detect the moving object by determining a connected region of pixels based on the foreground mask and determining a bounding box based on the connected region.

5. The computer of claim 4, the instructions further including instructions to determine x and y motion gradients of the moving object by calculating and accumulating gradients of horizontal and vertical line segments respectively of foreground pixels in the bounding box.

6. The computer of claim 5, the instructions further including instructions to determine magnitude and direction of motion of the moving object based on the x and y motion gradients.

7. The computer of claim 1, the instructions further including instructions to transform the magnitude and direction from pixel coordinates to global coordinates based on a three-dimensional, six-axis location and direction of a field of view of a video camera that acquired the video stream data, a magnification of a lens included in the video camera, and a location of a two-dimensional plane corresponding to a roadway in the field of view of the video camera.

8. The computer of claim 1, the instructions further including instructions to determine a vehicle path based on the magnitude and direction.

9. The computer of claim 8, the instructions further including instructions to operate the vehicle on the vehicle path and thereby avoiding the moving object.

10. The computer of claim 1, the instructions further including instructions to determine the eccentricity map based on video stream data determined by a user input constant γ to avoid numerical instability when $\sigma_k^2$ is near zero.

11. The computer of claim 1, the instructions further including instructions to determine the eccentricity map based on normalized eccentricity, which normalizes the eccentricity map to assume values in the range (0,1).

12. A method, comprising:
detecting a moving object in video stream data based on determining an eccentricity map and determining a foreground mask based on thresholding the eccentricity map;
determining a magnitude and direction of motion of the moving object;
transforming the magnitude and direction to global coordinates; and
operating a vehicle based on the transformed magnitude and direction.

13. The method of claim 12, further comprising determining the eccentricity map based on per-pixel mean and per-pixel variance calculated on video stream data.

14. The method of claim 12, further comprising determining the eccentricity map based on video stream data determined by a user input forgetting factor α.

15. The method of claim 12, further comprising detect the moving object by determining a connected region of pixels based on the foreground mask and determining a bounding box based on the connected region.

16. The method of claim 15, further comprising determining x and y motion gradients of the moving object by calculating and accumulating gradients of horizontal and vertical line segments respectively of foreground pixels in the bounding box.

17. The method of claim 16, further comprising determining magnitude and direction of motion of the moving object based on the x and y motion gradients.

18. The method of claim 12, further comprising transforming the magnitude and direction from pixel coordinates to global coordinates based on a three-dimensional, six-axis location and direction of a field of view of a video camera that acquired the video stream data, a magnification of a lens included in the video camera, and a location of a two-dimensional plane corresponding to a roadway in the field of view of the video camera.

19. The method of claim 12, further comprising determining a vehicle path based on the magnitude and direction.

20. The method of claim 19, further comprising operating the vehicle on the vehicle path and thereby avoiding the moving object.

* * * * *